3,551,326
PRODUCTION OF HIGH QUALITY JET FUEL
Clark J. Egan, Piedmont, Calif., assignor to Chevron Research Company, San Francisco, Calif., a corporation of Delaware
Continuation-in-part of application Ser. No. 771,880, Oct. 30, 1968. This application June 9, 1969, Ser. No. 831,690
Int. Cl. C10g *13/10, 39/00*
U.S. Cl. 208—93           5 Claims

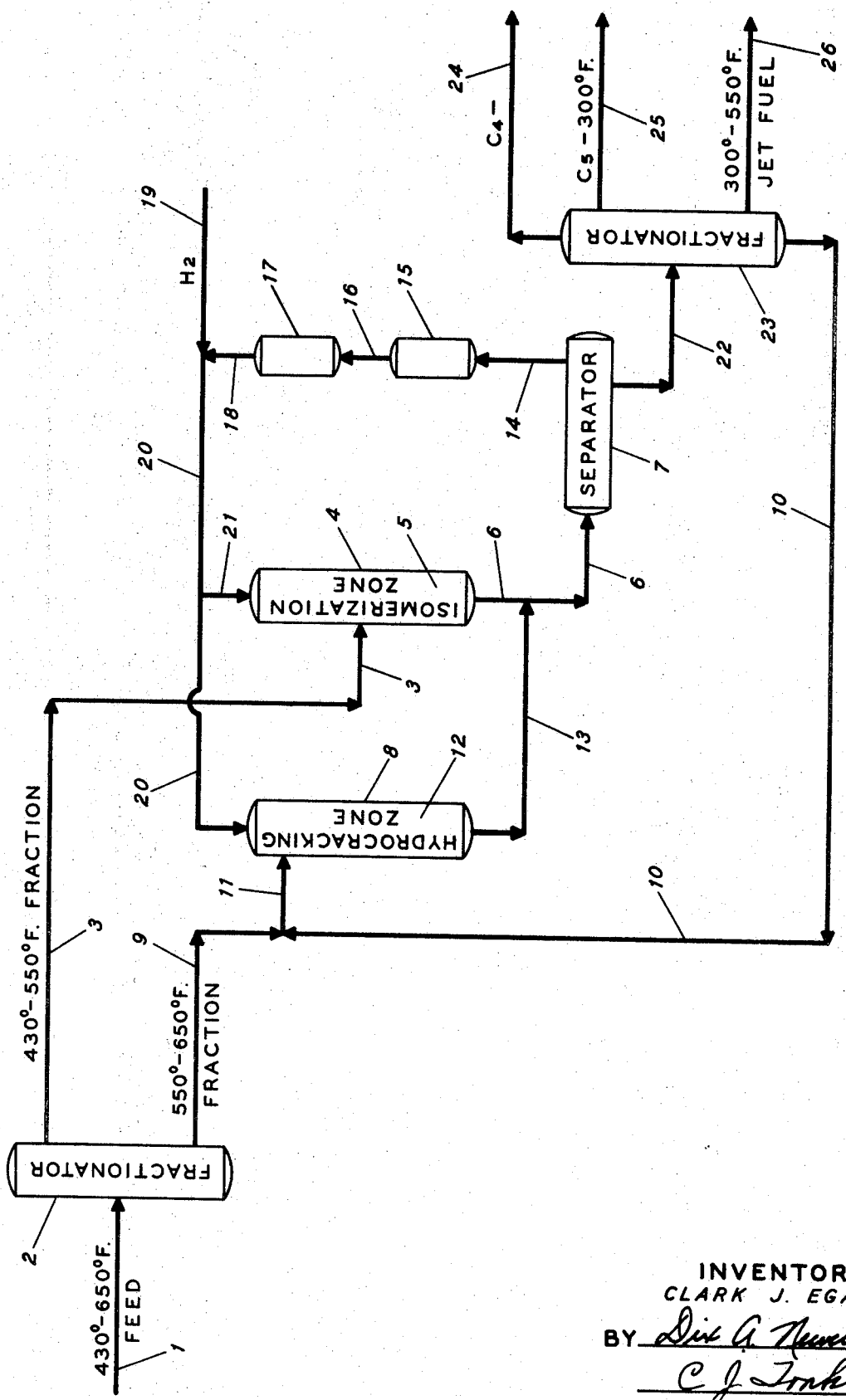

ABSTRACT OF THE DISCLOSURE

A hydrocarbon feed boiling above 550° F. is hydrocracked to a jet fuel boiling range material having low freeze point at hydrocracking conditions and in the presence of hydrogen with a catalyst comprising from 0.01 to 3 weight percent of a platinum group component and from 0.01 to 5 weight percent rhenium associated with alumina.

CROSS-REFERENCE

This application is a continuation-in-part of application Ser. No. 771,880, filed Oct. 30, 1968, which is incorporated herein by reference thereto.

BACKGROUND OF THE INVENTION

Field

The present invention relates to the hydrocracking of feedstocks boiling above 550° F. to produce synthetic jet fuel having exceptionally low freeze point.

Prior art

Processes for producing jet fuel fractions of high quality are particularly important because of the great present-day demand. Generally jet fuels boil within the range of 300 to 550° F. and are preferably highly paraffinic. It is particularly desirable to have a jet fuel with a low freeze point, thus making it more suitable for use in operations under conditions of extreme cold. Having a low freeze point, the jet fuel will remain liquid and flow freely without external heating even at very low temperatures.

SUMMARY OF THE INVENTION

A process has now been discovered which permits the production of high yields of jet fuel having exceptionally low freeze points. The process comprises contacting a feed boiling above about 550° F. in a reaction zone at hydrocracking conditions and in the presence of hydrogen with a catalyst comprising from 0.01 to 3 weight percent of a platinum group component and from 0.01 to 5 weight percent rhenium associated with alumina to produce low freeze point jet fuel boiling within the range of 300 to 550° F.

The present process is particularly valuable in that the ratio of jet fuel to gasoline produced is higher than that of processes using commercially available nickel-containing catalysts.

As a particular embodiment, the present invention comprises fractionating a hydrocarbon fraction boiling within the range of 300 to 750° F. into at least two streams, a first stream comprising a jet fuel fraction boiling from 300 to 550° F. and a second stream comprising a 550° F.+ material, contacting the first stream with a hydrogenation and/or an isomerization catalyst to improve the jet fuel characteristics thereof, contacting the second stream with a catalyst comprising 0.01 to 3 weight percent platinum and 0.01 to 5 weight percent rhenium in association with alumina at hydrocracking conditions to produce an effluent comprising jet fuel, recovering the jet fuel from the effluent and commingling the recovered jet fuel so produced with the jet fuel from the hydrogenation and/or isomerization zone.

BRIEF DESCRIPTION OF THE DRAWING

The process of the present invention will be more fully understood by reference to the figure. The figure is a schematic drawing of a particular embodiment of the present invention.

DESCRIPTION OF THE INVENTION

The catalyst used in the process of the present invention comprises platinum and rhenium in association with alumina. The alumina can be prepared as alumina hydrosol, alumina hydrogel, alumina xerogel, alumina monohydrate, sintered alumina, and the like. Alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

The catalyst proposed for use in the present invention, both for the hydrocracking and the isomerization, preferably comprises a platinum group component in an amount from 0.01 to 3 weight percent and more preferably from 0.2 to 1 weight percent based on the finished catalyst. Concentrations of rhenium in the finished catalyst composite are preferably from 0.01 to 5 weight percent and more preferably from 0.1 to 2 weight percent. The platinum group component embraces all the members of Group VIII of the Periodic Table having an atomic weight greater than 100 as well as compounds and mixtures of any of these. The platinum group components include ruthenium, rhodium, palladium, osmium, iridium and platinum. Platinum is a preferred component because of its high hydrogenation activity. Regardless of the form in which the platinum group component and rhenium exists on the catalyst, whether as metal or compound, the weight percent of each is calculated as the metal. The reference to "rhenium" or "rhenium component" is meant to include the metal, or compound, or mixtures thereof. Platinum-rhenium catalyst is more fully described in U.S. Pat. 3,415,737 and the description of the catalyst is incorporated herein by reference thereto.

The platinum group component and rhenium component can be associated with the alumina by various methods. The platinum group component and rhenium can be disposed on the alumina in intimate admixture with each other by a suitable technique such as ion-exchange, coprecipitation, impregnation, etc. It is not necessary that the platinum group component and rhenium component be incorporated with the alumina support by the same technique. One of the components can be associated with the alumina by one method, such as, for example, coprecipitation, and the other component associated with the alumina by another technique, such as, for example, impregnation. Furthermore, the components can be associated with the alumina either sequentially or simultaneously. It is generally preferred that the components be associated with the alumina by impregnation, either sequentially or simultaneously. In general the alumina is impregnated with an aqueous solution of a decomposable compound of platinum, etc., or rhenium, in sufficient concentration to provide the desired quantity of the platinum group component and rhenium component on the finished catalyst. To incorporate the preferred platinum group component, platinum, onto the alumina by impregnation, chloroplatinic acid is preferred. Other platinum group compounds are ammonium chloroplatinates, polyammineplatinum salts, palladium chloride, etc. Rhenium is suitably incorporated onto the support by impregnation with perrhenic acid. Ammonium, or potassium perrhenates, among others, can also be used.

The catalyst can be promoted for hydrocracking-isomerization by the addition of halides, particularly fluoride or chloride. Bromides may also be used. The halides apparently provide a limited amount of acidity to the catalyst which is beneficial to the production of low freeze point jet fuel. A catalyst promoted with halide preferably contains from 0.1 to 3 weight percent total halide content. The halides can be incorporated onto the catalyst carrier at any suitable stage of catalyst manufacture, e.g., prior to or following incorporation of the platinum group component and rhenium. Some halide is often incorporated onto the carrier by impregnating with the platinum group component; that is, for example, impregnation with chloroplatinic acid normally results in chloride addition to the carrier. Additional halide may also be incorporated onto the alumina if desired. In general, the halides are combined with the alumina by contacting suitable compounds such as hydrogen fluoride, ammonium fluoride, hydrogen chloride, or ammonium chloride, either in the gaseous form or in a water soluble form with the alumina. Preferably the fluoride or chloride is incorporated onto the carrier from an aqueous solution containing the halide.

Following incorporation of the alumina with the platinium group component and rhenium, the composite is dried by heating, e.g., at a temperature no greater than 500 and preferably from 200 to 400° F. and then calcined at an elevated temperature of up to 1200° F. if desired. The calcination temperature is preferably from 600 to 1200° F. and more preferably from 600 to 1000° F.

The catalyst is preferably subjected to a reducing atmosphere at an elevated temperature prior to use in the hydrocracking process. Reduction is preferably performed in the presence of hydrogen and more preferably in the presence of dry hydrogen. It is preferred that the pre-reduction be accomplished at a temperature in the range of 600 to 1300° F. and more preferably 600 to 1000° F.

The hydrocarbon feed, which is catalytically hydrocracked by the process of the present invention, includes middle distillate hydrocarbons. Thus, the feed should boil above at least 550° F. For purposes of the present invention, the feed should preferably boil within the range of 550 to 750° F. Heavier hydrocarbons can be used, for example, lubricating oils which boil above 650° F. and generally substantially above 750° F. As a particularly preferred embodiment, the feedstock will boil within the range of 550 to 650° F.

The feed to be hydrocracked may contain nitrogen, as organic nitrogen, and sulfur, as organic sulfur. Thus, the feed may be a straight-run distillate which has not been reduced in sulfur, i.e., which contains at least 10 p.p.m. sulfur by weight. Generally, however, it is preferred that the feed contain less than about 50 p.p.m nitrogen by weight, more preferably, less than about 40 p.p.m., and less than about 1.0 percent sulfur by weight, more preferably, less than about 0.5 percent. Feeds which are not already low in nitrogen and sulfur impurities may be reduced in nitrogen and sulfur by hydrofining.

Hydrofining operations for lowering the nitrogen and/or sulfur content of petroleum fractions are generally conducted at a temperature of from 500 to 850° F., a pressure within the range of from 400 to 4000 p.s.i.g., a liquid hourly space velocity (LHSV), i.e., the flow of hydrocarbon feed to catalyst, of from 0.2 to 10 volume of feed/volume of catalyst/hour (v./v./hr.) and a hydrogen flow rate of above about 500 s.c.f./bbl. of feed. Catalysts useful in hydrofining operations include, among others, alumina-containing supports having molybdenum and/or chromium oxide together with iron, cobalt and/or nickel oxides thereon.

The hydrocracking operation of the present invention is generally accomplished at a temperature of 450–950° F. and a pressure between about 500 to 10,000 p.s.i.g., preferably 800 to 6000 p.s.i.g. The hydrogen flow rate into the reactor is preferably maintained between 1000 to 20,000 s.c.f./bbl. of feed and more preferably from 4000 to 10,000 s.c.f./bbl. The liquid hourly space velocity will generally be in the range of from 0.5 to 10 and preferably 1 to 10.

The hydrocracking conditions are correlated in order to produce significant conversion of the feed contacting the catalyst to lower boiling products. Thus, the hydrocracking conditions are preferably maintained sufficiently severe to convert, per pass of the feed over the catalyst, at least 45 percent of the feed to lower boiling products and more preferably 50 percent. Of the lower boiling products thus produced, preferably at least 20 weight percent and more preferably at least 25 weight percent boil within the jet fuel range, i.e., from 300–550° F. Hydrocarbon components boiling above the jet fuel range can be separated from the product and recycled to the hydrocracking reactor.

A particular advantage of the present invention is that a jet fuel having exceptionally low freeze point is produced. Thus, a feed having a freeze point as high as 5 degrees Fahrenheit can be hydrocracked to a jet fuel having a freeze point as low as −50° F. It was unexpected that the platinum group component-rhenium catalyst associated with alumina would have high hydrocracking activity as well as significant freeze point lowering activity, that is, isomerization activity. Generally, in the process of the present invention a jet fuel fraction having a freeze point 20° F. and preferably 30° F. lower than the freeze point of the feed can be obtained.

As a further advantage of the present process, a jet fuel is obtained having a low aromatic content. Thus, a jet fuel is obtained with a high smoke point.

As a particular embodiment of the present invention, a feed boiling above the gasoline range, i.e., within the range of 300–800° F., can be processed to obtain a jet fuel fraction of high yield and low freeze point. The wide boiling range hydrocarbon feed is first fractionated to produce a first stream boiling within the jet fuel range and a second stream boiling above the jet fuel range. The jet fuel boiling range first stream can then be catalytically dewaxed in the presence of a catalyst comprising platinum group component and rhenium to lower the freeze point thereof. Alternately, the jet fuel boiling range stream can be hydogenated to decrease the aromatic content. The higher boiling second stream is hydrocracked at hydrocracking conditions in the presence of a platinum-rhenium-alumina catalyst to produce an effluent containing a significant amount of jet fuel. The effluent is then fractionated to obtain a jet fuel cut which is mixed with the jet fuel first stream and a higher boiling stream which is preferably recycled to the hydrocracking zone.

The embodiment of the present invention will be more clearly understood by reference to the figure. In the figure a feed boiling, e.g., from 430 to 650, is introduced by line 1 into fractionator 2. From fractionator 2 a first stream boiling within the jet fuel range, that is, from 430–550° F., is withdrawn by line 3 and introduced into reactor 4 containing a catalyst 5 comprising platinum, preferably platinum and rhenium, in association with a porous solid carrier as, for example, alumina. Preferably platinum is present in an amount from 0.01 to 3 weight percent and rhenium in an amount from 0.01 to 5 weight percent. The porous solid carrier is preferably an inorganic oxide and more preferably alumina. The reaction conditions in reactor 4 preferably include a temperature within the range of 700 to 950° F. and more preferably 750 to 900° F. The pressure will preferably be within the range of from 500 to 5000 p.s.i.g. and more preferably 500 to 2500 p.s.i.g. The liquid hourly space velocity (LHSV) preferably will be from 0.1 to 10 and more preferably from 0.3 to 3. A hydrogen to feed ratio of 500 to 20,000 s.c.f./bbl. of oil can be used. In reactor 4 the jet fuel fraction is isomerized to lower the freeze point characteristics; thus, whereas the feed to reactor 4 may have a freeze point of +10° F., the product may be as low as −40° F.

Effluent from reactor 4 is passed by line 6 to separator 7 in admixture with the effluent from hydrocracking reaction zone 8. The feed to hydrocracking reaction zone 8 is the heavy hydrocarbons boiling above the jet fuel range, that is 550–650° F. This fraction is removed from fractionator 2 by line 9 and mixed with a recycle stream from line 10. The combined stream enters reactor 8 by line 11. In reactor 8 a catalyst 12 comprising platinum and rhenium in association with alumina is used at hydrocracking conditions to crack the feed to lower boiling products in a per pass conversion of at least 45 percent. The effluent from reactor 8 is removed by line 13 and mixed with the effluent from reactor 4 and passed to separator 7. Hydrogen is recovered from the separator and passed by line 14 through a zine oxide bed 15 to remove primarily sulfur from the hydrogen stream. The hydrogen-rich stream is then passed by line 16 to molecular sieve 17 to remove $H_2O$, $NH_3$, and any additional $H_2S$ and other impurities. The purified hydrogen recycle stream is passed by line 18 and mixed with additional hydrogen by line 19. The total recycle stream is passed to reactor 8 by line 20 and reactor 4 by lines 20 and 21.

The hydrocarbons from separator 7 are removed by line 22 and passed to fractionator 23 wherein a light hydrocarbon $C_4$— stream is removed by line 24. A gasoline stream is removed by line 25 and a jet fuel stream of exceptionally low freeze point is removed by line 26. The gasoline stream boils from about 85° to 100° F. The jet fuel stream boils from 300 to 550° F. Heavy hydrocarbons boiling above the jet fuel range are recycled to the hydrocracking zone by line 10.

In a situation where the feedstock being processed contains hydrocarbon components boiling above 650° F., it may be advantageous to separate the 550° F.+ hydrocarbons in fractionator 23 into a 550° F.–650° F. stream and a 650° F.+ stream. The 550° F.–650° F. stream could be introduced to hydrocracking zone 8 by line 10. The 650° F.+ stream could be separately hydrocracked at severe conditions with, e.g., a nickel-containing catalyst, to substantially convert the 650° F.+ hydrocarbons to product boiling below 650° F. This lower boiling product could then be fractionated and the 550–650° F. fraction passed to hydrocracking zone 8.

By the scheme shown in the figure, significantly more jet fuel of exceptionally low freeze point can be produced than would be possible if the entire feed stream were processed in one reactor, namely, the hydrocracking reactor 8.

The process of the present invention will be more fully understood by reference to the following example.

EXAMPLE

A feed boiling within the range from 550 to 600° F. was hydrocracked by the process of the present invention, using a platinum-rhenium-alumina catalyst. For comparison purposes a similar 550–600° F. feed was hydrocracked to jet fuel using a commercial catalyst comprising nickel and tin in association with silica and alumina. The feed had a boiling range of from 550–600° F. and contained 19.5 volume percent paraffins, 66.1 volume percent naphthenes and 14.4 volume percent aromatics. The freeze point was +7° F. The feed contained 52 p.p.m. sulfur by weight and 1.8 p.p.m. nitrogen by weight.

The platinum-rhenium-alumina catalyst used to hydrocrack the feed to jet fuel contained 0.35 weight percent platinum, 0.35 weight percent rhenium, 0.20 weight percent chloride and 0.46 weight percent fluoride in association with alumina. The catalyst was prepared by impregnating rhenium as perrhenic acid onto a commercially available platinum - alumina containing catalyst. The nickel-tin-silica-alumina catalyst used for comparison contained 9 weight percent nickel as metal, 4 weight percent tin as metal, 56 weight percent silica and 29 weight percent alumina. The catalyst was prepared as a coprecipitated composite of nickel, tin, silica and alumina. The coprecipitation procedure involved preparing a solution of stannous chloride, aluminum chloride, nickel chloride and glacial acetic acid. Thereafter commercial sodium silicate dissolved in water was added and the resulting mixture rapidly stirred to form a clear solution and/or sol. The components were then coprecipitated to a final pH of about 7.5 by slowly adding, accompanied by stirring, a solution composed of ammonium hydroxide and water. The resulting slurry was then aged and filtered to remove excess water and the precipitate recovered. Water washing was accomplished to remove excess chloride. Thereafter the precipitate was dried and calcined at an elevated temperature. The nickel - tin - silica - alumina catalyst is more fully described in U.S. Pat. 3,399,132 wherein it is disclosed that the catalyst is an excellent hydrocracking catalyst.

The hydrocracking of the 550 to 600° F. feed over the two catalysts was conducted under conditions to give approximately the same percent conversion to lower boiling products. The conditions used and the results obtained are shown in the following table. The results were obtained after about 120 hours of hydrocracking.

| | $Pt$-$Re$-$Al_2O_3$ | $Ni$-$Sn$-$SiO_2$-$Al_2O_3$ |
|---|---|---|
| Conditions: | | |
| Per-pass conversion, percent | 61 | 58 |
| L.h.s.v | 1.0 | 2.0 |
| Temperature, °F | 800 | 520 |
| Pressure, p.s.i.g | 2,000 | 1,200 |
| Total gas recycle rate, s.c.f./bbl | 12,000 | 6,200 |
| Results: | | |
| $C_4$—, weight percent | 4 | 3 |
| $C_5$-300, weight percent | 14 | 21 |
| 300–550, weight percent | 43 | 34 |
| 550+, weight percent | 39 | 42 |
| Jet ultimate yield, wt. percent | 70 | 58 |
| Jet freeze point, °F | −58 | −41 |
| Aromatics, 300–550° F. fraction, wt. percent | 9 | 18 |
| Ratio jet/gasoline | 3.0 | 1.6 |

From the table, it is noted that the process of the present invention, that is, hydrocracking using the platinum-rhenium-alumina catalyst, produced a significantly higher yield of jet fuel, i.e., 43 weight percent, than the process using the nickel-tin-silica-alumina catalyst. The jet ultimate yield which is defined as the per pass jet fuel yield (weight percent) divided by percent of converted feed was also significantly higher for the process of the present invention. It is significant that the present process resulted in a higher ratio of jet fuel gasoline than the hydrocracking process using the commercial nickel-tin-silica-alumina catalyst. This is important because of the increasing demand for jet fuel. Also, the jet fuel produced had an exceptionally low freeze point, i.e., a freeze point of −58° F. and a low aromatics content.

The foregoing description of this invention is not to be considered as limiting since many variations can be made by those skilled in the art without departing from the spirit or scope of the appended claims.

I claim:
1. A process for producing a jet fuel boiling within the range from 300° F. to 550° F. from a hydrocarbon feed boiling above 550° F., the jet fuel having a freeze point at least 20° F. lower than the freeze point of the hydrocarbon feed, comprising:
   converting at least 45 volume percent of the hydrocarbon feed to lower boiling products at hydrocrack- ing conditions, the hydrocracking conditions including contacting the hydrocrabon feed, hydrogen, and a catalyst comprising 0.01 to 3 weight percent platinum group component and 0.01 to 5 weight percent rhenium in association with alumina, at a temperature from 450° F. to 950° F. and a pressure from 500 p.s.i.g. to 6000 p.s.i.g.

2. The process of claim 1 wherein said platinum group component is platinum.

3. The process of claim 1 wherein said catalyst contains from 0.1 to 3 weight percent halide.

4. A process for hydrocracking a hydrocarbon feed boiling from 300° F. to 750° F. to produce high yields of jet fuel boiling from 300° F. to 550° F., comprising:

separating the feed into a first stream boiling within the range from 300° F. to 550° F. and a second stream boiling above 550° F.;

contacting the first stream in a reaction zone under paraffin isomerization conditions including a temperature within the range from 700° F. to 950° F., a pressure within the range from 500 p.s.i.g. to 6000 p.s.i.g., a liquid hourly space velocity from 0.1 to 10, and a hydrogen to feed ratio from 500 to 20,000 standard cubic feet of hydrogen per barrel of oil, with an isomerization catalyst comprising platinum in association with a porous inorganic oxide carrier to lower the freeze point;

contacting the second stream in a hydrocracking zone at hydrocracking conditions in the presence of hydrogen with a catalyst comprising 0.01 to 3 weight percent of a platinum group component and 0.01 to 5 weight percent rhenium in association with alumina to convert at least 45 perecent of the feed to lower boiling products;

recovering a jet fuel fraction from the hydrocracked second stream; and combining the recovered jet fuel fraction with the effluend from the first contacting step.

5. The process of claim 4 wherein the isomerization catalyst includes 0.01 to 3 weight percent platium and 0.01 to 5 weight percent rhenium and the porous inorganic oxide is alumina.

References Cited
UNITED STATES PATENTS

| 3,015,549 | 1/1962 | Ciapetta et al. | 208—60 |
| 3,073,777 | 1/1963 | Oettinger | 208—59 |
| 3,231,628 | 1/1966 | Block | 208—15 |
| 3,236,764 | 2/1966 | Herder et al. | 208—210 |
| 3,268,436 | 8/1966 | Arey et al. | 208—15 |
| 3,308,052 | 3/1967 | Ireland et al. | 208—15 |
| 3,475,320 | 10/1969 | Demeester et al. | 208—27 |

HERBERT LEVINE, Primary Examiner

U.S. Cl. X.R.

208—15, 79, 112